(12) United States Patent
Agrawal et al.

(10) Patent No.: US 11,606,536 B1
(45) Date of Patent: Mar. 14, 2023

(54) ELECTRONIC DEVICE THAT MITIGATES AMBIENT LIGHTING LOSS DURING VIDEO COMMUNICATION

(71) Applicant: MOTOROLA MOBILITY LLC, Wilmington, DE (US)

(72) Inventors: Amit Kumar Agrawal, Bangalore (IN); Rahul B. Desai, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/410,430

(22) Filed: Aug. 24, 2021

(51) Int. Cl.
*H04N 7/15* (2006.01)
*H04N 5/235* (2006.01)
*G06V 40/16* (2022.01)

(52) U.S. Cl.
CPC ............. *H04N 7/15* (2013.01); *G06V 40/168* (2022.01); *G06V 40/172* (2022.01); *H04N 5/2354* (2013.01)

(58) Field of Classification Search
CPC ... H04N 7/14; H04N 7/15; G08B 5/22; G10L 15/26; H04L 43/16
USPC ............................................. 348/14.02–14.09
See application file for complete search history.

(56) References Cited

U.S. PATENT DOCUMENTS

| | | | |
|---|---|---|---|
| 9,967,520 B1* | 5/2018 | Rensburg | H04L 12/1822 |
| 2013/0050395 A1* | 2/2013 | Paoletti | G06V 30/142 |
| | | | 348/E7.083 |
| 2013/0069924 A1* | 3/2013 | Robinson | G09G 3/20 |
| | | | 345/207 |
| 2016/0047890 A1* | 2/2016 | Ryan | H04W 4/40 |
| | | | 398/118 |
| 2020/0077005 A1* | 3/2020 | Mondal | G06V 30/40 |
| 2021/0306546 A1* | 9/2021 | Jönsson | H04N 5/23245 |
| 2022/0224832 A1* | 7/2022 | Duran | H04N 7/183 |

* cited by examiner

*Primary Examiner* — Maria El-Zoobi
(74) *Attorney, Agent, or Firm* — Isidore PLLC

(57) ABSTRACT

An electronic device, computer program product, and method mitigate changes in ambient lighting of a local participant in a video communication session to avoid a distraction to other participant(s) using second electronic device(s). A controller of the electronic device monitors a current lighting level in an image stream captured and provided by an image capturing device(s) of the electronic device to the second electronic device(s). The electronic device communicates, via a network interface, a live version of the image stream to the video communication session while the current light level is at or above a lighting level threshold. In response to the current light level not being above the threshold, the controller responds by: (i) turning on a light source to illuminate at least one object that is being presented within the image stream; or (ii) communicating an alternate image stream, via the network interface, to the video communication session.

20 Claims, 8 Drawing Sheets

ELECTRONIC DEVICE THAT MITIGATES AMBIENT LIGHTING LOSS DURING VIDEO COMMUNICATION

BACKGROUND

1. Technical Field

The present disclosure relates generally to electronic devices that support and/or enable video communication sessions using a camera, and more particularly to electronic devices that support and/or enable video communication sessions and having a light that illuminates objects near the camera.

2. Description of the Related Art

User communication devices such as mobile phones, desktop workstations, laptops, and tablets are often equipped with a front side camera and a microphone to enable online human communication. Microphones and cameras can also be incorporated as peripheral devices. So as to simulate an in-person conversation, meeting, or lecture, each participant in a video communication session generally positions themself within the field of view of the local camera and within detection range of the microphone. The respective image and audio streams are communicated to the video communication session for presentation by one or more second electronic devices. Recent trends are for increased use of video communications in a wide range of worldwide locations.

Certain parts of the world are subject to unreliable or inadequate electrical power. Operators of electrical power utilities can resort to power shedding by turning off power to certain sectors of a power distribution system. Unreliable power utilities can also have unplanned brown-outs or black-outs. The loss of electrical power unexpectedly reduces the in-room lighting from overhead and/or standing lighting sources for a participant in a video conference, even when the communication equipment that supports the video conference is unaffected. For example, the local participant can use mobile communication devices that have stored battery power or a fixed communication system that uses an uninterruptible power supply. In this situation, the device of the local participant in the area affected by a power supply loss communicates an abrupt change in the participant's video image to other participants in the video conference.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
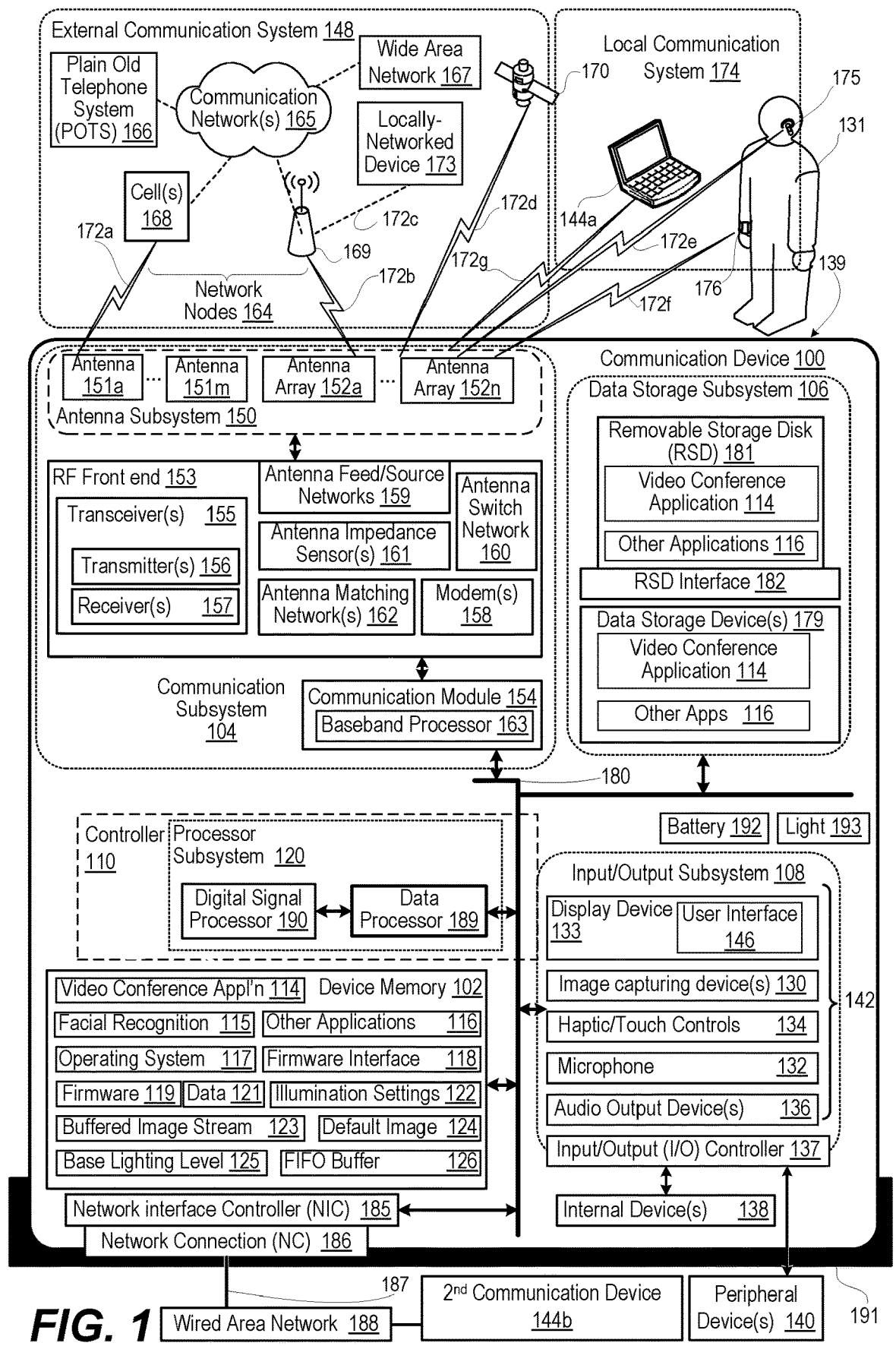
FIG. 1 depicts a functional block diagram of a communication environment including a communication device having components that respond to a reduction in ambient lighting that illuminates a participant in a video communication session, and within which the features of the present disclosure are advantageously implemented, according to one or more embodiments.

According to aspects of the present disclosure, an electronic device, a computer program product, and a method are provided that mitigate a reduction in ambient lighting that illuminates a participant in a video communication session. The electronic device includes at least one image capturing device that captures and provides an image stream. The electronic device includes a network interface that communicates the image stream via a network to a video communication session. A controller of the electronic device is communicatively coupled to the at least one image capturing device and the network interface. The controller enables the electronic device to communicate, using the network interface and the network, with one or more second electronic devices during the video communication session. The controller monitors, during the video communication session, an ambient lighting level in the image stream. The controller communicates, via the network interface, a live version of the image stream to the video communication session while the ambient light level is at or above a base lighting level. In response to detecting a current light level within the image stream that is below a light level threshold, the controller performs one of: (i) turning on a light source to illuminate at least one object that is being presented within the image stream; and (ii) communicating an alternate image stream, via the network interface, to the video communication session.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an operating environment having a functional block diagram of an electronic device, specifically communication device 100, within which several of the features of the present disclosure are advantageously implemented. Referring to the specific component makeup and the associated functionality of communication device 100 of FIG. 1. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, facial recognition utility 115, and other application(s) 116. In an example, facial recognition utility 115 can merely recognize a generic shape of a human face and distinguish the human face from an animal or inanimate object. In a particular example, the degree to which facial features are discernible to the facial recognition utility 115 can indicate whether a face is adequately illuminated. In another example, facial recognition utility 115 can recognize an orientation of a human face. In particular, facial recognition utility 115 can determine a direction in which a person is looking or speaking. In a further example, facial recognition utility 115 can use optical or infrared sensing to detect a two-dimensional or three-dimensional shape of a face. In one or more embodiments, facial recognition utility 115 includes range finding and direction finding capabilities to identify a relative position of a face. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100. The software and/or firmware modules have varying functionality when their corresponding program code is executed by processor subsystem 120 or secondary processing devices within communication device 100. Processor subsystem 120 of controller 110 can execute program code of video conference application 114 and other applications 116 to configure communication device 100 to perform specific functions. Device memory 102 can include data 121 used by the applications, such data 121 including illumination settings 122, buffered image stream 123, default image 124, and base lighting level 125 used by video conference application 114. Device memory 102 can also dynamically create data structures to support the applications, such as first in first out (FIFO) buffer 126 used by video conference application 114.

I/O subsystem 108 includes user interface components such as image capturing device 130, microphone 132, display device 133, touch/haptic controls 134, and audio output device(s) 136. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing device 130 and to at least one user interface device 142, such as at least one microphone 132. Image capturing device 130 and user interface device 142 allows local participant 131 using communication device 100 to be an active participant in a video communication session with second participant(s) using respectively second communication devices 144*a*-144*b*. Controller 110 is also communicatively coupled to at least one display device 133 that presents user interface 146 for the video communication session. Controller 110 executes video conference application 114 stored in device memory 102 to configure communication device 100 to enable communication with second communication device(s) 144a/144b in the video communication session. It is appreciated that second communication device(s) 144a/144b can be similarly configured and/or provide similar functionality as communication device 100. Communication device 100 is configured to monitor, during the video communication session with one or more second communication devices 144a/144b, an image stream from the at least one image capturing device 130 for adequate ambient lighting that sufficiently illuminates a face of local participant 131. In one or more embodiments, adequacy of the ambient lighting is determined based on a predetermined baseline lighting level. A relative amount of change in the ambient lighting can be distracting. In one or more embodiments, adequacy of the ambient lighting is determined based on having enough contrast and resolution of facial features of the face of local participant 131.

Each of communication device 100 and second communication devices 144a-144b can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received by antenna subsystem 150 from external communication system 148. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceivers 155. Antenna matching network(s) 162 can also be used to detune the impedance of lower band antennas 151a-151m to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151a-151m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node 169. In one or more particular embodiments, access node 169 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with headset 175. Communication subsystem 104 communicates via second low power wireless communication channel(s) 172f, such as Bluetooth, with smart watch 176. In one or more particular embodiments, communication subsystem 104 communicates with second communication device(s) 144a via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other applications 116. When executed by controller 110, the program code causes or configures communication device 100 to block a secondary image portion of a non-participant from appearing in an image stream communicated to second communication devices 144a-144b in a video communication session, as described herein.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Second communication devices 144b is presented communicatively couple to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189. Processor subsystem 120 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 180) are illustrated in FIG. 1, it is to be understood that more, fewer, or different interconnections may be present in other embodiments.

In one or more embodiments, communication device 100 includes battery 192 to enable mobile use of communication device 100 or for remaining operable when local electrical power sources are interrupted. For example, battery 192 can be an uninterruptible power supply. Even with loss of local power sources, communication device 100 can maintain connection to a video communication session via a remotely powered plain old telephone system (POTS) 166 or cells 168. In one or more embodiments, communication device 100 includes at least one light 193 and at least one image capturing device 130. The at least one light 193 can be integral to communication device 100 or communicatively coupled to communication device 100 remotely. The at least one light 193 can illuminate a face of local participant 131 that is near to communication device 100. In one or more embodiments, components such as at least one image capturing device 130 and at least one light 193 are embedded devices and integral to a unitary assembly within housing 139. In one or more embodiments, components such as at least one image capturing device 130 and at least one light 193 are accessories that are external to housing 139.

Figure 2A:
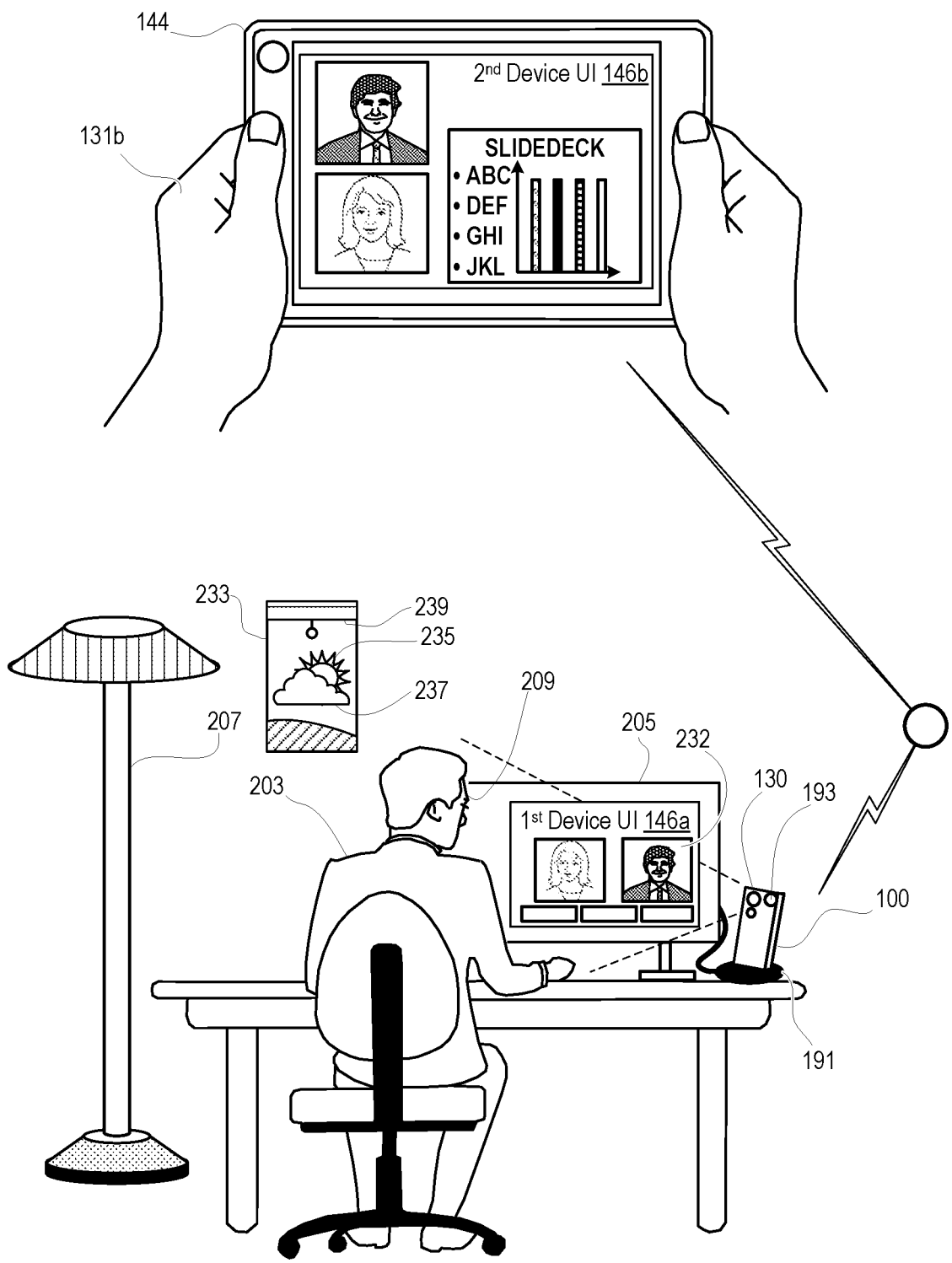
FIG. 2A depicts a front view of first and second communication devices each presenting a respective first and second user interface for a video communication session, according to one or more embodiments.

FIG. 2A depicts a front view of first and second communication devices 100/144 each presenting a respective user interface 146a-146b for a video communication session. For clarity, only two communication devices 100/144 are depicted connected via network 201. In one or more embodiments, three or more communication devices can be connected to the video communication session. Local participant 131a views user interface 146a presented on external display device 205. In one or more embodiments, external display device 205 is a monitor, a laptop screen, a desktop workstation, or a tablet computer. Communication device 100, such as a smart phone, includes front image capturing device 130a that has a field of view that initially incorporates local participant 203. In one or more embodiments, communication device 100 is received in dock 191 that maintains positioning of image capturing device 130. Dock 191 may provide power to communication device 100. In one or more embodiments, dock 191 provides a communication link from communication device 100 to external display device 205. In an alternate embodiment, the communication link from communication device 100 to external display device 205 is wireless. Local participant 131a can be initially illuminated by external light source 207, resulting in a satisfactorily illuminated face 209 of local participant 131a and a corresponding image stream 232 that is satisfactorily illuminated. Illumination can be wholly or partially provided by non-electrical lighting, such as sunlight through window 233 from sun 235 that can be lost or reduced by sunset, by clouds 237, or by window treatments 239. Light 193 incorporated in communication device 100, or remotely controllable by communication device 100, can augment or replace ambient light. As an example, the ambient light can be reduced by electrical power being unavailable to external light source 207. As another example, ambient light can be reduced by the setting of sun 235. In response to reduction in lighting, communication device 100 can turn on light 193 to increase lighting of at least participant 131a. Maintaining continuity in lighting of image stream 232 provides a less distracting presentation of image stream 232 on user interface 146b of communication device 144. The continuity in lighting can maintain a good user experience for remote participant 131b.

Figure 2B:
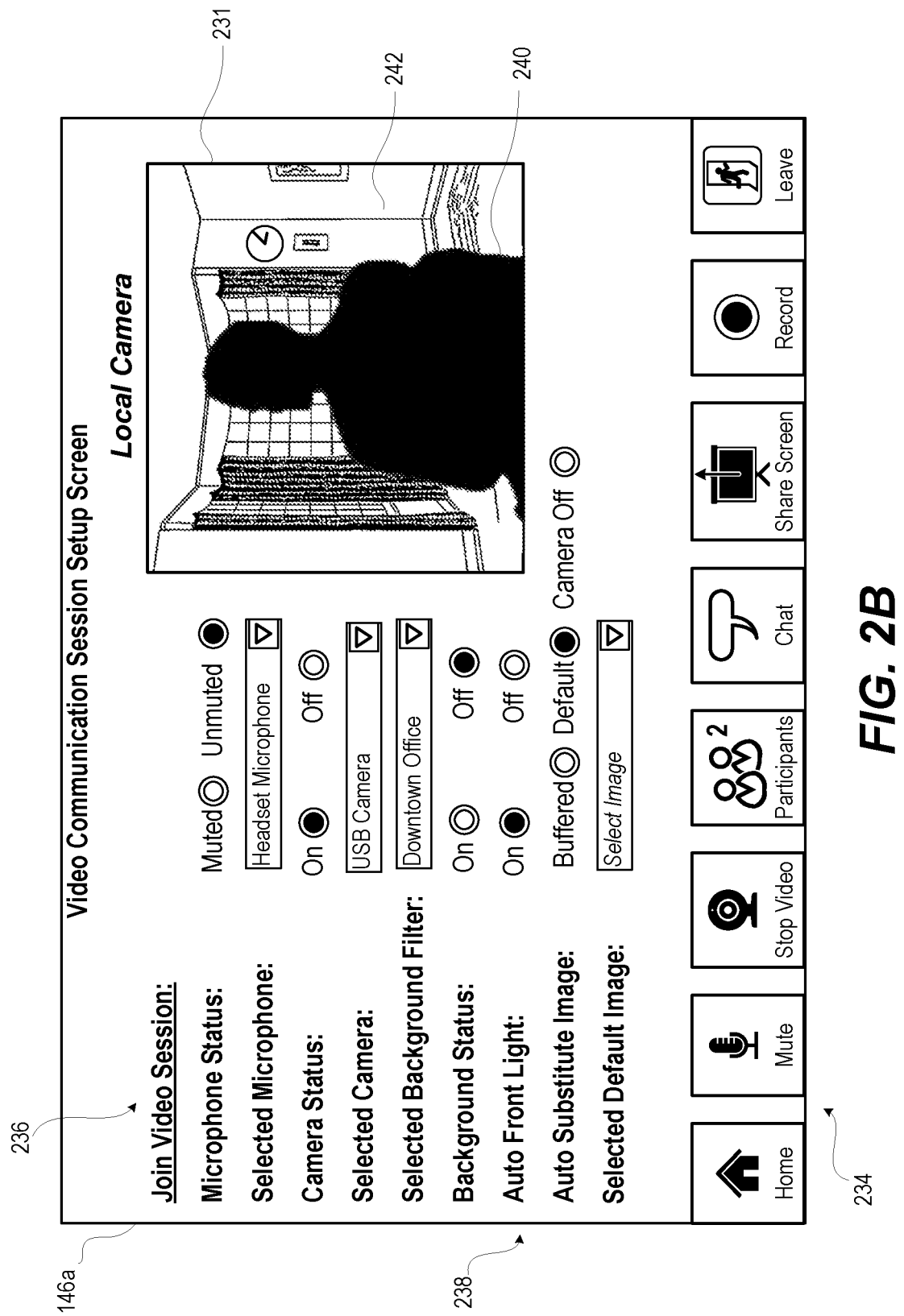
FIG. 2B depicts the first user interface that includes a baseline image of a participant incorporated in an image stream from an image capturing device of the first communication device, according to one or more embodiments.

FIG. 2B depicts user interface 146a presented by first communication device 100 (FIG. 2A). User interface 146a includes current image 231 in image stream 232 from image capturing device 130 (FIG. 2A). User interface 146a provides general video communication session controls 234 such as "Home", "Mute", "Stop Video", "Participants", "Chat", "Share Screen", "Record", and "Leave". User interface 146a provides camera/microphone setup controls 236 for a video communication session: (a) microphone muted/unmuted; (b) microphone selection; (c) camera on/off; (d) camera selection; (e) selected background filter; and (f) background status on/off. In the illustrative embodiment, user interface 146a provides the following reduced lighting mitigation controls 238: (a) Automatic front light on/off; (b) automatic substitute image; (c) automatic substitute image type: (i) "Buffered"; (ii) "Default"; or (iii) camera off; and (d) selected default image. Current image 231 of image stream 232 includes primary image portion 240 of local participant 203 (FIG. 2A) along with scene 242 of objects in a foreground or background to local participant 203 (FIG. 2A). Current image 231 depicts an inadequate lighting situation wherein scene 242 is illuminated by outside light, but primary image portion 240 is darkened due to being inadequately illuminated by internal lighting sources. As an example, local participant 203 is backlit by outside lighting sources but the face of local participant 203 (FIG. 2A) is insufficiently illuminated from the front.

Figure 3A:
FIG. 3A depicts an image stream that results from an adequate ambient lighting condition, according to one or more embodiments.
Figure 3B:
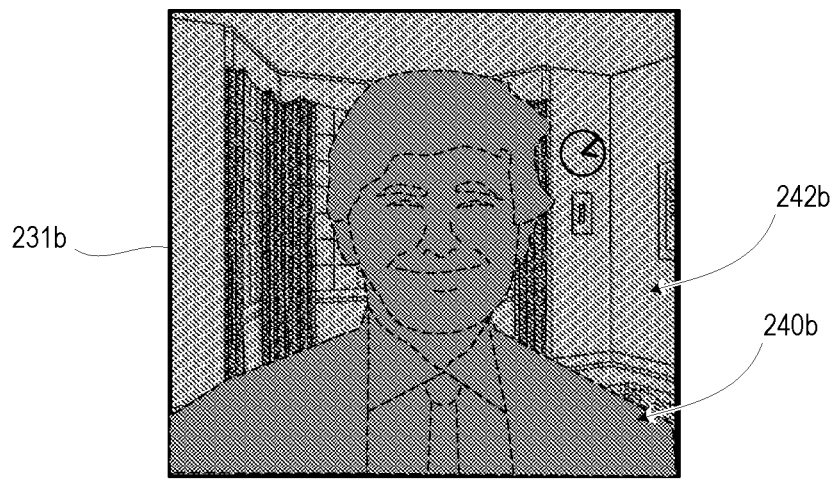
FIG. 3B depicts an image stream that results from an inadequate ambient lighting condition, according to one or more embodiments.
Figure 3C:
FIG. 3C depicts an image stream that results from an inadequate ambient lighting condition mitigated by a light of the electronic device of FIG. 1, according to one or more embodiments.
Figure 3D:
FIG. 3D depicts a buffered image that is sent to the video communication session in lieu of the image stream of FIG. 3B, according to one or more embodiments.
Figure 3E:
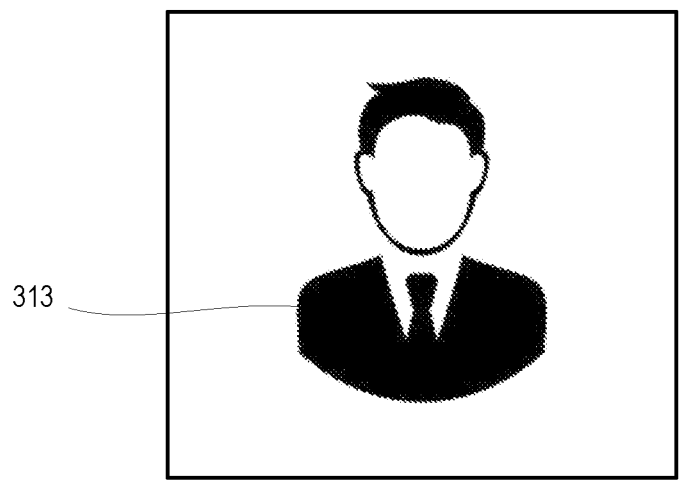
FIG. 3E depicts a default image that is sent to the video communication session in lieu of the image stream of FIG. 3B, according to one or more embodiments.

FIG. 3A depicts image stream 232a that results from an adequate ambient lighting condition. Primary image portion 240a is illuminated with facial features of participant 131 clearly discernable. Scene 242a is also well illuminated. Controller 110 (FIG. 1) communicates (enables transmission of) image stream 232a without requiring additional lighting from at least one light 193. FIG. 3B depicts image stream 232b that results from an inadequate ambient lighting condition for both primary image portion 240b and scene 242b. As an example, an interior space can have no windows for outside light, or the image stream is being captured during nighttime, when there is limited outside lighting. Thus, non-electrical outside lighting, such as sunshine or moonlight, can provide inadequate ambient lighting conditions. Interior lighting systems can be turned off due to loss of electrical power, and thus the environment has inadequate ambient lighting conditions. FIG. 3C depicts image stream 232c that results from an inadequate ambient lighting condition, but which is mitigated by at least one light 193 of communication device 100 or a remote light (193) communicatively connected to communication device 100 (FIG. 2A). Controller 110 (FIG. 1) activates or increases an illumination level of at least one light 193 (FIG. 1) in response to detecting the reduction in the ambient light level. FIG. 3D depicts buffered image stream 232d that is transmitted to the video communication session in lieu of image stream 232b (FIG. 3B). Controller 110 (FIG. 1) can buffer at least a baseline portion of the image stream 232a for other purposes such as determining an ambient lighting baseline. Controller 110 (FIG. 1) can determine that this buffered image stream 232d is the better option when the lighting level within image stream 232b (FIG. 3B) is unsatisfactory. Controller 110 (FIG. 1) can determine that when the lighting within the image stream 232b (FIG. 3B) is unsatisfactory, this buffered image stream 232d is the user preferred option from among more than one type of substitute image streams. FIG. 3E depicts default image 313 that is transmitted to the video communication session in lieu of image stream 232b (FIG. 3B). Default image 313 can be a photograph, an avatar, a graphic symbol, alphanumeric text, or other image or video segment selected from controller 110. As an example, controller 110 (FIG. 1) can select a name of local participant 131a (FIG. 2). As another example, controller 110 (FIG. 1) can select an informational message such as "Video Unavailable". As an additional example, Controller 110 (FIG. 1) can use an informational message received from local participant 131a (FIG. 2) such as "at work site with limited connectivity". Controller 110 (FIG. 1) can select, from among more than one default image 313, a particular default image 313 that is associated with a context of the video communication session. As an example, controller 110 (FIG. 1) can associate one default image 313 with a work video context and another default image 313 with a personal video context.

Figure 4A:
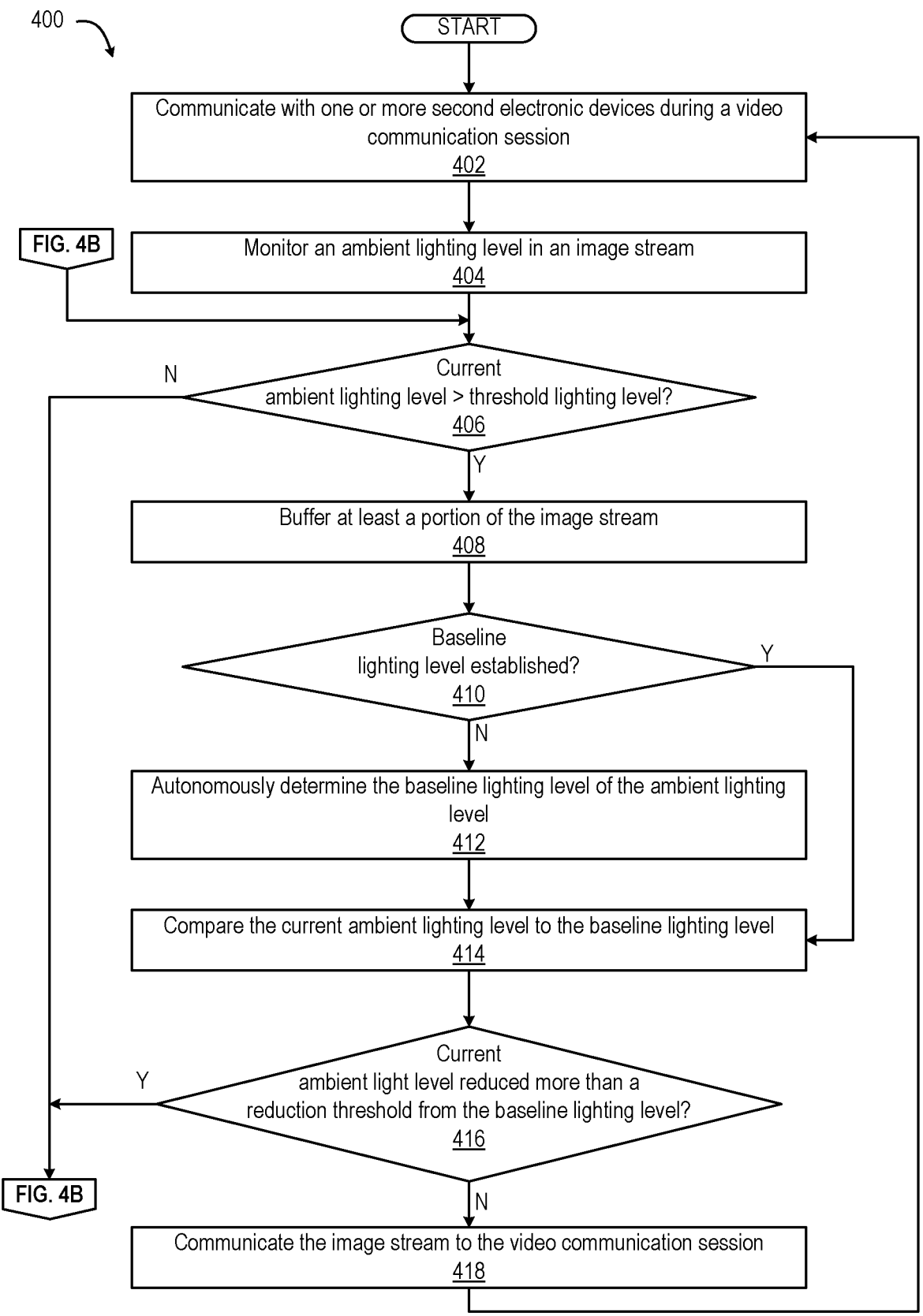
FIGS. 4A-FIG. 4B (FIG. 4) present a flow diagram of a method for mitigating a reduction in ambient lighting of a participant in a video communication session by communicating a substitute image stream, according to one or more embodiments.
Figure 4B:
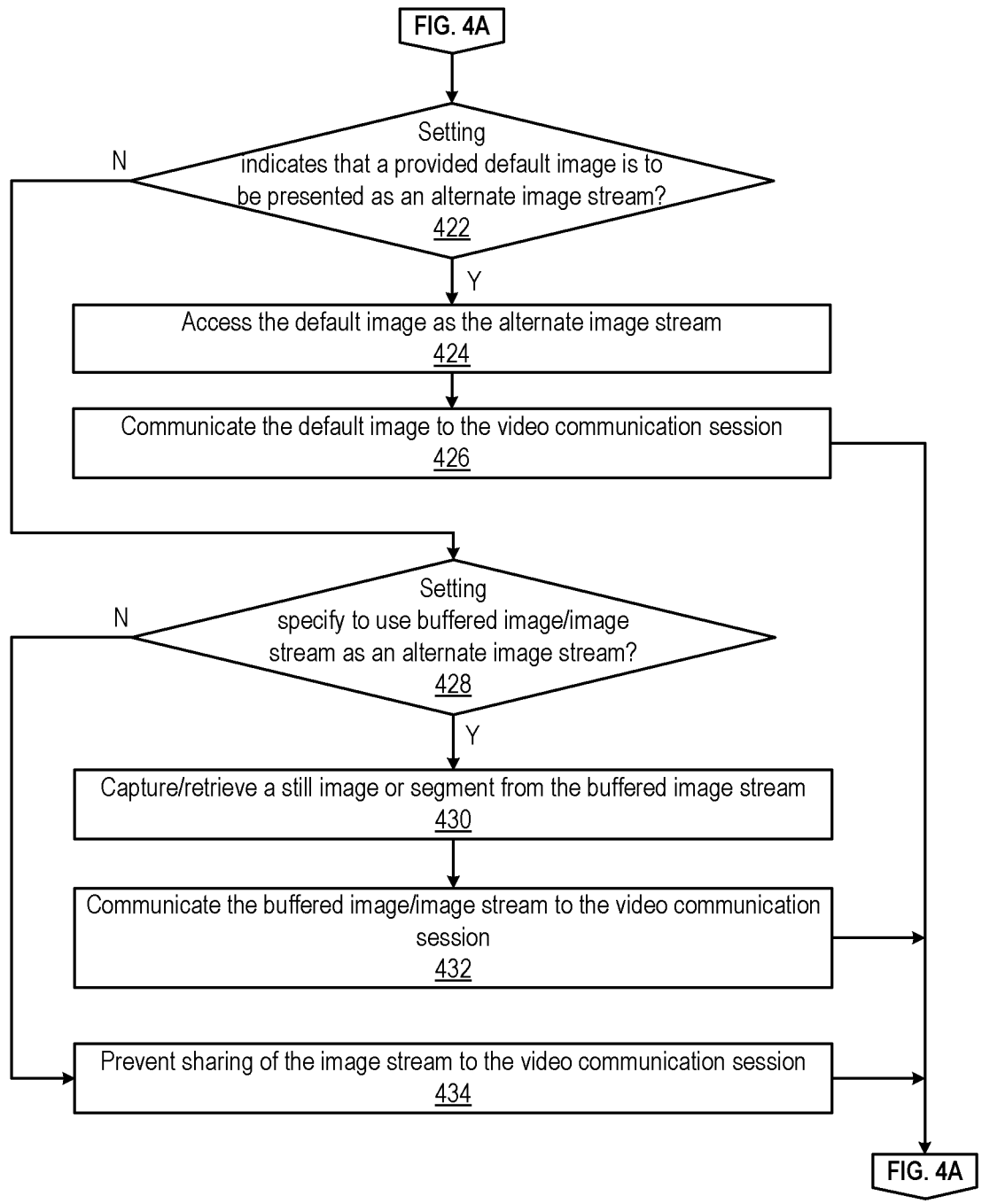
Figure 5:
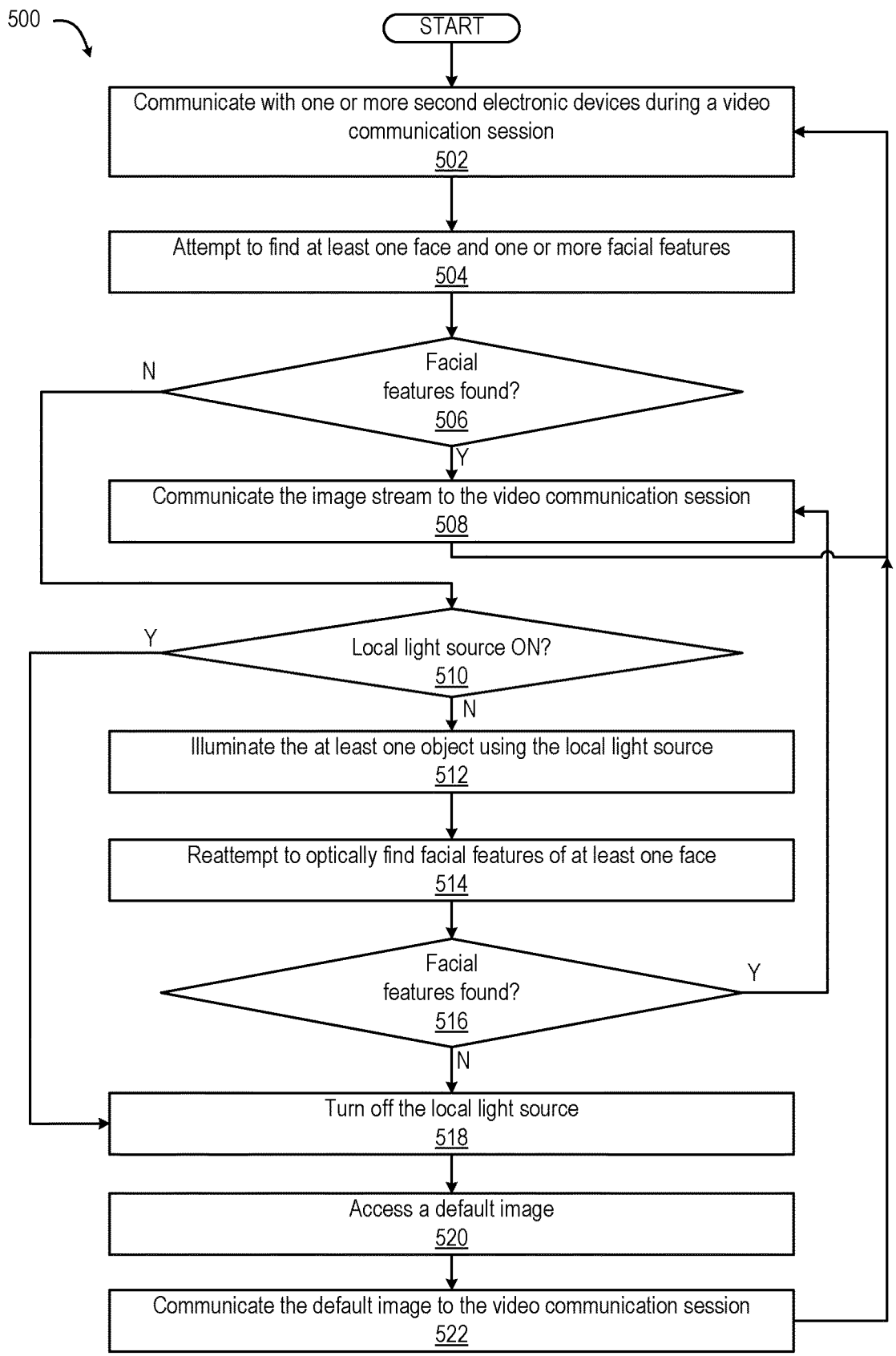
FIG. 5 presents a flow diagram of a method for mitigating a reduction in ambient lighting that illuminates a participant in a video communication session by controlling a light, according to one or more embodiments.

FIGS. 4A-FIG. 4B (FIG. 4) present a flow diagram of method 400 for mitigating a reduction in ambient lighting of a participant in a video communication session by communicating a substitute image stream. In at least one embodiment, communication device 100, managed by controller 110, executes video conference application 114, configuring communication device 100 (FIG. 1) to facilitate a video communication session. The description of method 400, as well as method 500 discussed below with regards to FIG. 5, are provided with general reference to the specific components illustrated within the preceding FIGS. 1, 2A-2B, and 3A-3E, and specific components referenced in methods 400 and 500 can be identical or similar to components of the same name used in describing preceding FIGS. 1, 2A-2B, and 3A-3E. Controller 110 performs methods 400/500 to provide a less distracting presentation of the image stream on the user interface of a second communication device, which performance can maintain a good user experience for a remote participant. In one or more embodiments, method 400 provides detecting and responding to the ambient light level being below a threshold. As an example, method 500 can mitigate when the image stream is too dark at the start of the video communication session or becomes dark during the video communication session. Thus, method 400 provides a situation in which the image stream is too dark from a start of the video communication session. In one or more embodiments, method 400 also provides detecting and responding to a sudden reduction in the ambient light level that is a sufficient change to be distracting. As an example, method 400 addresses a power shedding event that affects interior lighting. In one or more embodiments, method 500, which can operate in parallel to method 400, provides detecting and responding to an insufficiently illuminated face of a local participant. As an example, method 500 can mitigate an adverse ambient condition caused by back lighting of the local participant, where the background is adequately illuminated but the local participant is not. Automatic lighting controls of an image capturing device can be adversely affected by backlighting, causing the face of the local participant to appear dark.

With reference to FIG. 4A, method 400 includes communicating, using a network interface of an electronic device, with one or more second electronic devices during a video communication session (block 402). Method 400 includes monitoring, during the video communication session using the network interface, an ambient lighting level in an image stream captured and provided by at least one image capturing device (block 404).

Method 400 includes determining whether the ambient lighting level is greater than a threshold lighting level (decision block 406). As an example, the threshold lighting level can be set to be sufficiently high so that the local participant will be adequately illuminated. In one or more embodiments, the threshold lighting level is user set. The determination can be made at the start of the video communication session or periodically throughout the video communication session to enable communicating the image stream. In response to determining that the ambient lighting level is not greater than (i.e., is less than or equal to) the threshold lighting level, method 400 proceeds to block 422 (FIG. 4B). In response to determining that the ambient lighting level is greater than the threshold lighting level, method 400 includes buffering at least a portion of the image stream (block 408). In one or more embodiments, the controller buffers the image stream during an initial portion of the video communication session in order to establish a baseline lighting level. The controller can detect a change in ambient light levels by comparing current conditions to the baseline. In one or more embodiments, the controller buffers, in a first in first out (FIFO) buffer, a recent portion of the image stream. The controller detects trends in ambient light levels of the video content buffered in this FIFO buffer. The controller can capture from the buffered image stream an image or image/video segment preceding an abrupt reduction in ambient lighting level. The capture buffered image can then be used in lieu of the image with reduced lighting level. In one or more embodiments, the controller buffers the image stream for the entirety of the video communication session. Method 400 includes determining whether a baseline lighting level has been established for the video communication session (decision block 410). In response to determining that the baseline lighting level has been established (i.e., "Yes" in decision block 410), method 400 proceeds to block 414. In response to determining that the baseline lighting level has not been established (i.e., "No" in decision block 410), method 400 includes autonomously determining the baseline lighting level of the ambient lighting level during an initial portion of the video communication session (block 412). Method 400 includes comparing the current ambient lighting level to the threshold lighting level (block 414). Method 400 includes determining whether the current ambient lighting level of the image stream is reduced by more than a reduction threshold from the baseline lighting level (decision block 416). The reduction threshold (i.e., difference between lighting levels) is set to be a sufficiently distracting change as to degrade user experience for remote participants. In response to determining that the ambient light level is reduced more than the reduction threshold from the baseline lighting level, method 400 proceeds to block 422 (FIG. 4B). In response to determining that the ambient light level is not reduced more than the reduction threshold from the baseline lighting level, method 400 includes communicating the image stream, via the network interface and network, to the video communication session (block 418). Method 400 returns to block 402.

With reference to FIG. 4B, method 400 includes determining whether a setting of the conferencing software indicates that a provided default image is to be presented as an alternate image stream when live image stream is not sufficiently illuminated (decision block 422). In response to determining that the setting indicates the default image is to be presented as an alternate image stream, method 400 includes accessing the default image (block 424). The default image can be an image associated with the participant or user of the device or another user-selected or pre-programmed image. Method 400 includes communicating the provided default image, via the network interface and network, to the video communication session (block 426). Then method 400 returns to block 406 (FIG. 4A). In response to determining that the setting does not indicate that the default image is to be presented as an alternate image stream, method 400 includes determining whether a setting of the conferencing software indicates that a still image or segment captured from the buffered image stream is to be presented as an alternate image stream when live image stream is not sufficiently illuminated (decision block 428). In response to determining that a setting of the conferencing software indicates that the still image or segment captured from the buffered image stream is to be presented as the alternate image stream, method 400 includes capturing/retrieving a still image or segment from the buffered image stream image prior to the reduction in ambient lighting level for use as the alternate image stream (block 430). Method 400 includes communicating the still image or segment as an alternate image stream, via the network interface and network, to the video communication session (block 432). Then method 400 returns to block 406 (FIG. 4A). In response to determining that the setting of the conferencing software does not indicate that the still image or segment captured from the buffered image stream is be presented as the alternate image stream, method 400 includes preventing sharing of the image stream to the video communication session (block 434).

FIG. 5 presents a flow diagram of a method for mitigating a reduction in ambient lighting that illuminates a participant in a video communication session by controlling a local light source. The ambient lighting is provided by at least one of sunlight/moonlight or a lighting system that is not controlled by the communication device. The communication device has control of a local light source that can augment ambient lighting, such as at least one light 193 (FIG. 1). In one or more embodiments, method 500 can be performed when an initial lighting condition is inadequate for illuminating the environment around the participant or the face of the participant. Method 500 can also be performed when the baseline lighting is initially adequate/sufficient and the lighting subsequently reduces to be inadequate. Method 500 includes communicating, via a network interface of an electronic device, with one or more second electronic devices during a video communication session (block 502). Method 500 includes attempting to find at least one face and one or more facial features of the at least one face in the image stream (block 504). The facial recognition can determine whether the face is sufficiently illuminated and that more than a silhouette of a head can be detected. According to one or more embodiments, thresholds are set for contrast between the face and facial features to correspond to a range of typical illumination situations. Method 500 includes determining whether one or more facial features of the at least one face are found in the image stream (decision block 506). In response to determining that one or more facial features of the at least one face are found in the image stream, method 500 includes communicating the image stream to the video communication session (block 508). Then method 500 returns to block 504. In response to determining that one or more facial features of the at least one face are not found in the image stream, method 500 includes determining whether the local light source is ON (decision block 510). As an example, method 500 can include previously turning on the local light source which was successful for a period of time in illuminating the face of the local participant. However, with further reduction in the ambient light, the local light source can be insufficient. As another example, the local light source can be positioned too far away from the local participant or provide too little illumination to effectively illuminate the face of the local participant. In response to determining that the local light source is ON, method 500 proceeds to block 518. In response to determining that the local light source is not ON (i.e., OFF), method 500 includes turning on the local light source of the communication device to illuminate the at least one object that is being presented with the image stream (block 512). Method 500 includes reattempting to optically find at least one face and one or more facial features of the at least one face in the image stream (block 514). Method 500 includes determining whether one or more facial features of the at least one face are found in the image stream (decision block 516). In response to determining that the one or more facial features of the at least one face are found in the image stream, method 500 returns to block 508. In response to determining that the one or more facial features of the at least one face are not found in the image stream, method 500 turns off the local light source (block 518). Method 500 includes accessing a default image (block 520). Method 500 includes communicating the default image to the video communication session (block 522). Then method 500 returns to block 502.

According to aspects of the present disclosure, an electronic device such as communication device 100 (FIG. 1) can perform methods 400 and 500 of FIGS. 4A, 4B, and 5. In one or more embodiments, the electronic device includes at least one image capturing device that captures and provides an image stream including at least one object in a communication session. The electronic device includes a network interface that communicates the image stream via a network to the video communication session. The electronic device includes a controller that is communicatively coupled to the at least one image capturing device and the network interface. The controller configures the electronic device to communicate, using the network interface and the network, with one or more second electronic devices during the video communication session. The electronic device monitors, during the video communication session, a current lighting level within the image stream. The controller determines whether the current lighting level within the image stream is greater than at least one light level threshold that indicates that the participant is sufficiently illuminated. The controller configures the communication device to communicate, via the network interface, a live version of the image stream to the video communication session in response to the current lighting level being above the at least one light level threshold. In response to the current lighting level not being above the at least one light level threshold, the controller configures the electronic device to perform one of: (i) turning on a light source to illuminate at least one object that is being presented within the image stream; and (ii) communicating an alternate image stream, via the network interface, to the video communication session.

In one or more embodiments, the controller configures the electronic device to: (i) buffer at least a portion of the image stream while the current light level is above a light level threshold; and (ii) responds to the current lighting level not being above the at least one lighting level threshold by communicating at least a still image from the buffered image stream to the video communication session as the substitute image stream. In one or more embodiments, the controller configures the electronic device to: (i) access a default image associated with a user of the electronic device; and (ii) respond to the current lighting level not being above the at least one lighting level threshold by communicating the default image to the video communication session as the substitute image stream.

In one or more embodiments, the controller configures the electronic device to: (i) attempt to identify the at least one object in the image stream; and (ii) determine that a current lighting level is not above the at least one lighting level threshold in response to the at least one object not being identifiable in the image stream. In one or more particular embodiments, the controller attempts to identify the at least one object comprising one or more facial features of a face in the image stream. The controller attempts to identify one or more facial features of the at least one face. The controller determines that a current lighting level not being above the at least one lighting level threshold exists based on determining that one or more facial features of the at least one face are not identifiable in the image stream. In one or more particular embodiments, the electronic device includes a light source having a switching mechanism that is communicatively coupled to the controller. The controller responds to the current lighting level not being above the at least one lighting level threshold by illumining the at least one object with the light source. The controller reattempts to identify the at least one object in the illuminated image stream. The controller determines whether the at least one object while illuminated by the light source is identifiable in the image stream. The controller responds to the current lighting level not being above the at least one lighting level threshold by turning off the light source and communicating the alternate image stream to the video communication session.

In one or more embodiments, the controller configures the electronic device to determine a baseline lighting level during an initial portion of the video communication session. The controller determines the at least one lighting level threshold that is a predefined reduction level from the baseline lighting level. The predefined reduction level is deemed to reduce a user experience for one or more participants using the one or more second electronic devices. In one or more particular embodiments, subsequent to responding to the current lighting level not being above the at least one lighting level threshold, the controller monitors, during the video communication session, for a return of the current lighting level to be above the at least one lighting level threshold. In response to the current lighting level returning to be above the at least one lighting level threshold, the controller configures the electronic device to reverse each action taken in response to the current lighting level not being above the at least one light level threshold and resumes communicating the image stream to the video communication session.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one image capturing device that captures and provides an image stream including at least one object in a communication session;
   a network interface that communicates the image stream via a network to the video communication session; and
   a controller communicatively coupled to the at least one image capturing device and the network interface, and which:
      communicates, using the network interface and the network, with one or more second electronic devices during the video communication session;
      monitors, during the video communication session, a current lighting level within the image stream;
      determines whether the current lighting level within the image stream is greater than at least one light level threshold that indicates that the participant is sufficiently illuminated;
      communicates, via the network interface, a live version of the image stream to the video communication session in response to the current lighting level being above the at least one light level threshold that indicates that the participant is sufficiently illuminated; and
      in response to the current lighting level not being above the at least one light level threshold and the controller having control of a light source that can augment ambient lighting and is not currently on, turning on the light source to illuminate at least one object that is being presented within the image stream.

2. The electronic device of claim 1, wherein the controller:
   buffers at least a portion of the image stream while the current light level is above a light level threshold; and
   responds to the current lighting level not being above the at least one lighting level threshold by communicating at least one of an alternate image stream, via the network interface, to the video communication session and a still image taken from the buffered image stream to the video communication session as the substitute image stream.

3. The electronic device of claim 1, wherein the controller:
   accesses a default image associated with a user of the electronic device; and
   responds to the current lighting level not being above the at least one lighting level threshold by communicating the default image to the video communication session as a substitute image stream.

4. The electronic device of claim 1, wherein the controller:
attempts to identify the at least one object in the image stream; and
determines that a current lighting level is not above the at least one lighting level threshold in response to the at least one object not being identifiable in the image stream.

5. The electronic device of claim 4, wherein the controller:
attempts to identify the at least one object comprising one or more facial features of a face in the image stream;
attempts to identify one or more facial features of the at least one face; and
determines that a current lighting level not being above the at least one lighting level threshold exists based on determining that the one or more facial features of the at least one face are not identifiable in the image stream.

6. The electronic device of claim 1, further comprising the light source having a switching mechanism that is communicatively coupled to the controller, wherein the controller:
responds to the current lighting level not being above the at least one lighting level threshold by illuminating the at least one object with the light source;
reattempts to identify the at least one object in the illuminated image stream;
determines whether the at least one object while illuminated by the light source is identifiable in the image stream; and
responds to the current lighting level not being above the at least one lighting level threshold by turning off the light source and communicating an alternate image stream to the video communication session.

7. The electronic device of claim 1, wherein the controller:
determines a baseline lighting level during an initial portion of the video communication session; and
determines the at least one lighting level threshold that is a predefined reduction level from the baseline lighting level that is deemed to reduce a user experience for one or more participants using the one or more second electronic devices.

8. The electronic device of claim 1, wherein, subsequent to responding to the current lighting level not being above the at least one lighting level threshold, the controller:
monitors, during the video communication session, for a return of the current lighting level to be above the at least one lighting level threshold; and
in response to the current lighting level returning to be above the at least one lighting level threshold, reverses each action taken in response to the current lighting level not being above the at least one light level threshold and resumes communicating the image stream to the video communication session.

9. A method comprising:
receiving an image stream from an image capturing device of an electronic device, the image stream incorporating at least one object in a communication session;
communicating during the video communication session using a network interface via a network to one or more second electronic devices;
monitoring, during the video communication session, a current lighting level within the image stream;
determining whether the current lighting level within the image stream is greater than at least one light level threshold that indicates that the participant is sufficiently illuminated;
communicating, via the network interface, a live version of the image stream to the video communication session in response to the current lighting level being above the at least one light level threshold that indicates that the participant is sufficiently illuminated; and
in response to the current lighting level not being above the at least one light level threshold and the controller having control of a light source that can augment ambient lighting and is not currently on turning on the light source to illuminate the at least one object that is being presented within the image stream.

10. The method of claim 9, further comprising:
buffering at least a portion of the image stream while the current light level is above a lighting level threshold; and
responding to the current lighting level not being above the at least one lighting level threshold by communicating at least one of an alternate image stream, via the network interface, to the video communication session and a still image taken from the buffered image stream to the video communication session as the substitute image stream.

11. The method of claim 9, further comprising:
accessing a default image associated with a user of the electronic device; and
responding to the current lighting level not being above the at least one lighting level threshold by communicating the default image to the video communication session as a substitute image stream.

12. The method of claim 9, further comprising:
attempting to identify the at least one object in the image stream; and
determining that a current lighting level is not above the at least one lighting level threshold in response to the at least one object not being identifiable in the image stream.

13. The method of claim 12, further comprising:
attempting to identify the at least one object comprising one or more facial features of a face in the image stream;
attempting to identify one or more facial features of the at least one face; and
determining that a current lighting level not being above the at least one lighting level threshold exists based on determining that the one or more facial features of the at least one face are not identifiable in the image stream.

14. The method of claim 9, further comprising:
responding to the current lighting level not being above the at least one lighting level threshold by illuminating the at least one object with the light source;
reattempting to identify the at least one object in the illuminated image stream;
determining whether the at least one object while illuminated by the light source is identifiable in the image stream; and
responding to the current lighting level not being above the at least one lighting level threshold by turning off the light source and communicating an alternate image stream to the video communication session.

15. The method of claim 9, further comprising:
determining a baseline lighting level during an initial portion of the video communication session; and
determining the at least one lighting level threshold that is a predefined reduction level from the baseline lighting level that is deemed to reduce a user experience for one or more participants using the one or more second electronic devices.

16. The method of claim 9, further comprising:
subsequent to determining that the reduced lighting state exists:
monitoring, during the video communication session, for a return of the current lighting level to be above the at least one lighting level threshold; and
in response to the return of the current lighting level to the at least one lighting level threshold, reversing each action taken in response to the current lighting level not being above the at least one light level threshold and resuming communicating the image stream to the video communication session.

17. A computer program product comprising:
a non-transitory computer readable storage device; and
program code on the non-transitory computer readable storage device that when executed by a processor associated with an electronic device, the program code enables the electronic device to provide functionality of:
receiving an image stream from an image capturing device of an electronic device, the image stream incorporating at least one object in a communication session;
communicating during the video communication session using a network interface via a network to one or more second electronic devices;
monitoring, during the video communication session, a current lighting level within the image stream;
determining whether the current lighting level within the image stream is greater than at least one light level threshold that indicates that the participant is sufficiently illuminated;
communicating, via the network interface, a live version of the image stream to the video communication session in response to the current lighting level being above the at least one light level threshold that indicates that the participant is sufficiently illuminated; and
in response to the current lighting level not being above the at least one light level threshold and the controller having control of a light source that can augment ambient lighting and is not currently on turning on the light source to illuminate the at least one object that is being presented within the image stream.

18. The computer program product of claim 17, wherein the program code enables the electronic device to provide the functionality of:
buffering at least a portion of the image stream while the current light level is above a lighting level threshold; and
responding to the current lighting level not being above the at least one lighting level threshold by communicating at least one of an alternate image stream, via the network interface, to the video communication session and a still image taken from the buffered image stream to the video communication session as the substitute image stream.

19. The computer program product of claim 17, wherein the program code enables the electronic device to provide the functionality of:
accessing a default image associated with a user of the electronic device; and
responding to the current lighting level not being above the at least one lighting level threshold by communicating the default image to the video communication session as a substitute image stream.

20. The computer program product of claim 17, wherein the program code enables the electronic device to provide the functionality of:
determining a baseline lighting level during an initial portion of the video communication session; and
determining the at least one lighting level threshold that is a predefined reduction level from the baseline lighting level that is deemed to reduce a user experience for one or more participants using the one or more second electronic devices.

* * * * *